US012402656B2

(12) United States Patent
Courbat et al.

(10) Patent No.: US 12,402,656 B2
(45) Date of Patent: Sep. 2, 2025

(54) AEROSOL-GENERATING ARTICLE COMPRISING A MAIN RESERVOIR AND A CAPILLARY BUFFER RESERVOIR

(71) Applicant: Philip Morris Products S.A., Neuchatel (CH)

(72) Inventors: Jerome Christian Courbat, Cortaillod (CH); Oleg Mironov, Cudrefin (CH); Ozgur Ozsun, Kilchberg (CH)

(73) Assignee: Philip Morris Products S.A., Neuchatel (CH)

( * ) Notice: Subject to any disclaimer, the term of this patent is extended or adjusted under 35 U.S.C. 154(b) by 393 days.

(21) Appl. No.: 17/998,100

(22) PCT Filed: May 12, 2021

(86) PCT No.: PCT/EP2021/062569
§ 371 (c)(1),
(2) Date: Nov. 7, 2022

(87) PCT Pub. No.: WO2021/228911
PCT Pub. Date: Nov. 18, 2021

(65) Prior Publication Data

US 2023/0165305 A1 Jun. 1, 2023

(30) Foreign Application Priority Data

May 15, 2020 (EP) .................................... 20175049

(51) Int. Cl.
*A24F 40/42* (2020.01)
*A24F 40/10* (2020.01)
(Continued)

(52) U.S. Cl.
CPC .............. *A24F 40/42* (2020.01); *A24F 40/10* (2020.01); *A24F 40/44* (2020.01); *A24F 40/465* (2020.01); *A24F 40/485* (2020.01); *H05B 6/108* (2013.01)

(58) Field of Classification Search
None
See application file for complete search history.

(56) References Cited

U.S. PATENT DOCUMENTS

2015/0245669 A1* 9/2015 Cadieux ................ A61M 15/06 131/329
2020/0205474 A1 7/2020 Tong
(Continued)

FOREIGN PATENT DOCUMENTS

EP 3 337 341 A1 6/2018
RU 2 616 556 C2 4/2017
(Continued)

OTHER PUBLICATIONS

Russian Search Report issued May 28, 2024 in Russian Patent Application No. 2022132673/03 (with English Translation of Category of Cited Documents), 3 pages.
(Continued)

*Primary Examiner* — Katherine A Will
(74) *Attorney, Agent, or Firm* — Oblon, McClelland, Maier & Neustadt, L.L.P.

(57) ABSTRACT

An aerosol-generating article for an aerosol-generating device is provided, the aerosol-generating article including a main reservoir to store aerosol-forming liquid; a capillary buffer reservoir in fluid communication with the main reservoir to store the aerosol-forming liquid due to capillary action; and a liquid conduit in fluid communication at least with the capillary buffer reservoir and being configured to provide the aerosol-forming liquid at an interface to an outside of the capillary buffer reservoir and the main reser-
(Continued)

voir, in which the liquid conduit includes a filament bundle, and in which the filament bundle includes a plurality of first filaments including or being made of a first susceptor material.

18 Claims, 5 Drawing Sheets

(51) Int. Cl.

| | |
|---|---|
| ***A24F 40/44*** | (2020.01) |
| ***A24F 40/465*** | (2020.01) |
| ***A24F 40/485*** | (2020.01) |
| ***H05B 6/10*** | (2006.01) |

(56) References Cited

U.S. PATENT DOCUMENTS

| | | | | |
|---|---|---|---|---|
| 2020/0345069 | A1* | 11/2020 | Potter | A24F 40/46 |
| 2021/0120874 | A1 | 4/2021 | Tong | |
| 2021/0186104 | A1 | 6/2021 | Mironov et al. | |
| 2021/0204600 | A1 | 7/2021 | Frederick et al. | |

FOREIGN PATENT DOCUMENTS

| | | | |
|---|---|---|---|
| RU | 2 676 006 | C2 | 12/2018 |
| RU | 2 677 617 | C1 | 1/2019 |
| RU | 2 700 159 | C2 | 9/2019 |
| WO | WO 2015/175568 | A1 | 11/2015 |
| WO | WO 2019/145672 | A1 | 8/2019 |
| WO | WO 2019/206985 | A1 | 10/2019 |
| WO | WO 2019/229197 | A1 | 12/2019 |

OTHER PUBLICATIONS

International Search Report & Written Opinion issued Sep. 14, 2021 in PCT/EP2021/062569, filed on May 12, 2021, 14 pages.

Office Action issued May 26, 2025, in corresponding Japanese Patent Application No. 2022-567765, with English translation, citing reference 15 therein.

* cited by examiner

AEROSOL-GENERATING ARTICLE COMPRISING A MAIN RESERVOIR AND A CAPILLARY BUFFER RESERVOIR

The present disclosure relates to an aerosol-generating article for use with an aerosol-generating device which comprises at least one liquid reservoir for storing an aerosol-forming liquid. The present disclosure further relates to an aerosol-generating system comprising such an article and an aerosol-generating device for use with the article.

Generating inhalable aerosols by heating aerosol-forming liquids is generally known from prior art. For this, a liquid aerosol-forming substrate may be conveyed by a liquid conduit, for example a wick element, from a liquid reservoir into a region outside the reservoir. There, the liquid may be vaporized by a heater and subsequently exposed to an air path such as to form an inhalable aerosol. Both, the liquid reservoir and the liquid conduit may be part of an aerosol-generating article that is configured to be inserted into an aerosol-generating device in order to vaporize the aerosol-forming liquid stored in the article.

Practice has shown that aerosol generation using such systems occasionally does not work reliably. In particular, aerosol generation may depend on the position in which the aerosol-generating system is held by a user during operation.

Therefore, it would be desirable to have an aerosol-generating article and an aerosol-generating system for generating an aerosol from an aerosol-forming liquid with the advantages of prior art solutions, whilst mitigating their limitations. In particular, it would be desirable to have an aerosol-generating article and an aerosol-generating system for reliably generating an aerosol from an aerosol-forming liquid.

According to the present invention, there is provided an aerosol-generating article for use with an aerosol-generating device. The article comprises a main reservoir for storing aerosol-forming liquid and a capillary buffer reservoir in fluid communication with the main reservoir for storing aerosol-forming liquid due to capillary action. The article further comprises a liquid conduit in fluid communication at least with the capillary buffer reservoir for providing aerosol-forming liquid at an interface to the outside of the capillary buffer reservoir and the main reservoir.

According to the invention it has been found that aerosol generation is deficient in many systems due to the fact that the liquid conduit is properly immersed in aerosol-forming liquid only in certain position. However, in certain positions, for example, when the aerosol-generating system is turned upside down, the aerosol-forming liquid may be dislocated in the reservoir such that the liquid conduit is not in contact with liquid anymore. As a consequence, the delivery of aerosol-forming liquid to the vaporization zone outside the reservoir is interrupted which causes a rapid decrease or even outage of aerosol formation. In addition, due to the lack aerosol-forming liquid, the liquid conduit may be overheated in the vaporization zone which in turn may cause the generation of hazardous components coming either from the aerosol-forming liquid or the article material.

To remedy this, the present invention proposes to use a small volume capillary buffer reservoir in fluid communication with the main reservoir and the liquid conduit. The buffer reservoir is configured storing aerosol-forming liquid due to capillary action in order to reliably provide a liquid conduit in fluid communication with the buffer reservoir with a sufficient amount of aerosol-forming liquid, independent of the article position. To this extent, it has been found that if the volume of the capillary buffer reservoir is chosen small enough, capillary effects dominate over gravity. As a consequence, once aerosol-forming liquid filled in the buffer reservoir, it is prevented from flowing back into the main reservoir, in particular when the orientation of the article is changed, for example, from a substantially upright position into a substantially horizontal position or even into an upside down position. Basically the capillary buffer reservoir of the aerosol-generating article according to the present invention acts like a buffer reservoir of a fountain pen.

From theory one would expect the capillary length to greatly vary for liquids with different surface tensions and densities. However, in practice the capillary length is generally on the order of a few millimeters for most liquids. The reason for such a narrow range of capillary lengths for different liquids lies, inter alia, in surface imperfections, contact angle hysteresis, and surface cleanliness. Accordingly, the dimensions of the capillary buffer reservoir may be chosen such that a maximum dimension between two opposing walls defining at least a portion of the capillary buffer reservoir is in a range between 0.2 millimeter and 5 millimeter, in particular between 0.5 millimeter and 3 millimeter, preferably between 1 millimeter and 2.5 millimeter. These values ensure sufficient capillary action, whilst still enabling to provide a sufficiently large buffer volume for storing a sufficient amount of aerosol-forming liquid. In particular, it has been found that is sufficient that only one dimension of the buffer reservoir is smaller than the effective capillary length. In particular, the capillary action of the buffer reservoir may be due to a maximum dimension between two opposing walls defining at least a portion of the capillary buffer reservoir being in a range between 0.2 millimeter and 5 millimeter, in particular between 0.5 millimeter and 3 millimeter, preferably between 1 millimeter and 2.5 millimeter.

The capillary buffer reservoir may have a total volume up to 60 cubic millimeters, in particular up to 50 cubic millimeters, preferably up to 40 cubic millimeters, more preferably up to 30 cubic millimeters, most preferably up to 20 cubic millimeters. These volumes still ensure proper capillary action Vice versa, the total volume of the capillary buffer reservoir may be at least 5 cubic millimeters, in particular at least 10 cubic millimeters, preferably at least 15 cubic millimeters. These volumes are still large enough to trap and provide a sufficient amount of aerosol-forming liquid in the capillary buffer reservoir lasting at least for a few puffs.

The capillary buffer reservoir comprises a lamella structure. Using a lamella structure advantageously enables to increase the inner surface of the buffer reservoir, and thus to increase the capillary action. The lamella structure basically acts like a lamella structure in a fountain pen.

In particular, the lamella structure may comprise a plurality of lamellae. The plurality of lamellae may be arranged next to each other, in particular in a side by side configuration, spaced apart from each other. As discussed above in general with regard to the maximum dimension between opposing walls of the buffer reservoir, a maximum dimension between adjacent lamellae advantageously may be in a range between 0.2 millimeter and 5 millimeter, in particular between 0.5 millimeter and 2.5 millimeter, preferably between 1 millimeter and 2 millimeter.

In particular, the buffer reservoir may be free of any capillary material and liquid retention material. More particularly, the buffer reservoir may be a cavity or an empty-space, unless filled with aerosol-forming liquid.

In general, the main reservoir and the capillary buffer reservoir may be in fluid communication with each other in different ways.

As an example, the main reservoir may directly open out into the capillary buffer reservoir. That is, the main reservoir and the capillary buffer reservoir together may form a joint reservoir, wherein each one of the main reservoir and the capillary buffer forms one part thereof. Advantageously, such a configuration is easy and inexpensive to manufacture.

As another example, the main reservoir and the capillary buffer reservoir may be in fluid communication with each other via at least a first liquid channel. In this configuration, the main reservoir and the capillary buffer reservoir are separate from each other and fluidly connected by the at least first liquid channel only. Advantageously, this configuration may retard a reflow of aerosol-forming liquid from the capillary buffer reservoir into the main reservoir, in particular in case the capillary action would be temporarily insufficient to properly trap the aerosol-forming liquid within the capillary buffer reservoir.

The first liquid channel may be configured such as to divert a liquid flow through the article by at least 90 degrees, in particular by 180 degrees. This allows for a compact design of the aerosol-generating article having the main reservoir and the capillary buffer reservoir being arranged next to each other.

In addition to the first liquid channel, the main reservoir and the capillary buffer reservoir may also be in fluid communication with each other at least via a second liquid channel. A second channel may facilitate, in particular expedite a refill of the capillary buffer reservoir from the main reservoir while or after the aerosol-forming liquid in the capillary buffer reservoir is depleted via the liquid conduit is use of the aerosol-generating system.

Advantageously, at least one of the first fluid channel and the second fluid channel may also serve a capillary buffer for aerosol-forming liquid. Accordingly, a maximum dimension between two opposing walls defining at least a portion of at least one of the first fluid channel or the second fluid channel, respectively, may be in a range between 0.2 millimeter and 5 millimeter, in particular between 0.5 millimeter and 4 millimeter, preferably between 1 millimeter and 3 millimeter, most preferably between 2 millimeter and 3 millimeter. In particular, a diameter of at least one of the first fluid channel and the second fluid channel may be in a range between 0.2 millimeter and 5 millimeter, in particular between 0.5 millimeter and 4 millimeter, preferably between 1 millimeter and 3 millimeter, most preferably between 2 millimeter and 3 millimeter.

With regard to a liquid flow through the article, the capillary buffer reservoir preferably is downstream of the main reservoir. Likewise, the liquid conduit preferably is downstream of the capillary buffer reservoir with regard to a liquid flow through the article.

Further with regard to a liquid flow through the article, at least a portion of the fluid conduit is arranged at or in a downstream portion of the capillary buffer reservoir. Advantageously, this arrangement ensures that the liquid conduit is properly immersed in the aerosol-forming liquid trapped in the capillary buffer reservoir. This in turn ensures a proper delivery of aerosol-forming liquid form the buffer reservoir into the region outside the main reservoir and the buffer reservoir where the aerosol-forming liquid may be vaporized.

In particular, the main reservoir, the buffer reservoir and the heating zone may be fluidly connected in series.

As already mentioned further above, the capillary buffer reservoir may be arranged adjacent to the main reservoir. This arrangement proves advantageous with regard to a compact design of the aerosol-generating article, in particular with regard to a short length dimension of the aerosol-generating article. A compact design is particularly preferred with respect to the fact that the aerosol-generating article according to the present invention preferably is used with a handheld aerosol-generating device.

The aerosol-generating article may have a simple design. The article may have an article housing comprising the main reservoir and the capillary buffer reservoir. The housing is preferably a rigid housing comprising a material that is impermeable to liquid. As used herein “rigid housing” means a housing that is self-supporting. The housing may comprise or may be made of one of PEEK (polyether ether ketone), PP (polypropylene), PE (polyethylene) or PET (polyethylene terephthalate). PP, PE and PET are particularly cost-effective and easy to mold, in particular to extrude. The housing may also comprise flexible sections or collapsed sections. The housing may further comprise at least one breather hole for volume compensation.

In particular, the aerosol-generating article may comprise a partition wall defining both, at least a portion of the main reservoir and at least a portion of the capillary buffer reservoir. This configuration further enhances the compactness of the article design. The partition wall may be part of the article housing.

Furthermore, it is possible that at least a portion of the main reservoir and at least a portion of the capillary buffer reservoir are formed integrally with each other. Due this, the aerosol-generating article is particular easy and inexpensive to manufacture. For example, at least apportion of the main reservoir and the capillary buffer reservoir the reservoir body may be integrally formed as extruded reservoir body, in particular a one-piece extruded reservoir body.

In order to further enhance the delivery of aerosol-forming liquid to be vaporized into a region outside the main reservoir and the capillary buffer reservoir, the liquid conduit may be also in direct fluid communication with the main reservoir. That is, the liquid counted may be in fluid communication with both, the capillary buffer reservoir and the main reservoir.

In order to fluidly couple the liquid conduit with the main reservoir, the aerosol-generating article may comprise a bypass channel providing a direct fluid communication between main reservoir and the fluid conduit, bypassing the main reservoir.

Alternatively or in addition, the aerosol-generating article may comprise three intersecting fluid channels each of which is connected to one of the main reservoir, the capillary buffer reservoir and the fluid conduit for providing a nodal fluid communication between each two of the main reservoir, the capillary buffer reservoir and the fluid conduit.

As described above, at least a portion of the fluid conduit may be arranged at or in a downstream portion of the capillary buffer reservoir. For that purpose, the liquid conduit may pass through a wall defining at least a portion of the capillary buffer reservoir. The wall may be, for example, a separating wall or a bushing separating the capillary buffer reservoir from a vaporization zone. The vaporization zone may be zone to which aerosol-forming liquid is conveyed by the liquid conduit and in which the conveyed aerosol-forming liquid is vaporized in use of the article with an aerosol-generating device. Accordingly, the aerosol-generating article may comprise a vaporization zone, in particular a vaporization cavity, for vaporizing aerosol-forming liquid.

In order to provide aerosol-forming liquid in the vaporization zone, the liquid conduit may pass into the vaporization zone or may face the vaporization zone. As used herein, the term "face vaporization cavity" refers to a configuration in which the liquid conduit is in fluid communication with, but does not pass into the vaporization zone.

In general, the liquid conduit may have any shape and configuration suitable to convey from the capillary buffer reservoir to the vaporization zone. In particular, the liquid conduit may comprise a wick element. The configuration of the wick element may be a stranded wire, a stranded rope of material, a mesh, a mesh tube, several concentric mesh tubes, a cloth, sheets of material, or a foam (or other porous solid) with sufficient porosity, a roll of fine metal mesh or some other arrangement of metal foil, fibers or mesh, or any other geometry that is appropriately sized and configured to carry out the wicking action as described herein.

The liquid conduit, in particular the wick element, may comprise a filament bundle including a plurality of filaments. Preferably, the filament bundle is an unstranded filament bundle. In an unstranded filament bundle, the filaments of the filament bundle run next to each other without crossing each other, preferably along the entire length extension of the filament bundle. Likewise, the filament bundle may comprise a stranded portion, in which the filaments of the filament bundle are stranded. A stranded portion may enhance the mechanical stability of the filament bundle.

As an example, the filament bundle may comprise a parallel-bundle portion along at least a portion of its length extension in which the plurality of filaments may be arranged parallel to each other. The parallel-bundle portion may be arranged at one end portion of the filament bundle or between both end portions of the filament bundle. Alternatively, the parallel-bundle portion may extend along the entire length dimension of the filament bundle.

As another example, the filament bundle may comprise a first soaking section, a second soaking section and an intermediate section between the first soaking section and the second soaking section. Along at least the intermediate section the plurality of filaments may be arranged parallel to each other. With regard to the specific configuration of the article having a buffer reservoir and a vaporization zone, each of the first soaking section and the second soaking section may be arranged at least partially in the capillary buffer reservoir, while the intermediate section may be arranged in a region outside the capillary buffer reservoir, in particular in the vaporization zone.

Using filaments for conveying liquids is particularly advantageous because filaments inherently provide a capillary action. Moreover, in a filament bundle, the capillary action is further enhanced due to the narrow spaces formed between the pluralities of filaments when being bundled. In particular, this applies for a parallel arrangement of the filaments along which the capillary action is constant as the narrow spaces between the filaments do not vary along the parallel arrangement.

Preferably, the filaments are solid material filaments. Solid material filaments are inexpensive and easy to manufacture. In addition, solid material filaments provide a good mechanical stability, thus making the filament bundle robust. In general, the may have any cross-sectional shape suitable for conveying aerosol-forming liquid, in particular when being bundled. Accordingly, the filaments may have a circular, an ellipsoidal, an oval, a triangular, a rectangular, a quadratic, a hexagonal or a polygonal cross-section. Preferably, the filaments have a substantially circular, oval or elliptically cross-section. Having such a cross-section, the filaments are not in area contact, but only in a line contact with each other causing the formation of capillary spaces between the pluralities of filaments on its own.

The capillary action generally relies on a reduction in the surface energy of the two separate surfaces, the liquid surface and the solid surface of the filaments. The capillary action includes an effect that depends on the radius of curvature of both the liquid surface and the filaments. Hence, there may be a need for large surface areas and small radii of curvature, both of which are achieved by a small diameter of the filaments. Accordingly, the plurality of first filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

In general, the filament bundle may be a linear filament bundle, that is, a substantially straight, non-curved or non-bent filament bundle. This configuration does not exclude little bending of the filament bundle, that is, large curvature radii along the length extension of the filament bundle. As used herein, large curvature radii may include curvature radii being 10 times, in particular 20 times or 50 times or particular 100 times larger than the total length of the filament bundle. Alternatively, the filament bundle may be curved. In particular, the filament bundle may be substantially U-shaped or C-shaped or V-shaped.

The plurality of filaments may be surface treated. In particular, the plurality of filaments may comprise at least partially a surface coating, for example, an aerosolization enhancing surface coating, a liquid-adhesive surface coating, a liquid repellent surface coating, or an antibacterial surface coating. The aerosolization enhancing surface coating advantageously may in particular enhance the variety of a user's experience. The liquid adhesive surface coating may be beneficial with regard to an enhancement of the capillary action of the filament bundle. The antibacterial surface coating may serve to reduce a bacterial contamination. A liquid repellent coating, in particular at an extremity of the filaments, may avoid liquid dropping.

Depending on the available space, the dimensions of the filaments and the amount of aerosol-forming liquid to be conveyed and heated, the filament bundle may comprise 3 to 100 filaments, in particular 10 to 80 filaments, preferably 20 to 60 filaments, more preferably 30 to 50 filaments, for example 40 filaments.

As yet another example, the liquid conduit may comprise two filament arrays crossing each other partially. In particular, the liquid conduit may comprise an array of longitudinal filaments arranged side by side as well as an array of transverse filaments arranged side by side and crossing the array of longitudinal filaments transverse to a length extension of the longitudinal filaments. The array of transverse filaments may only extend along a length portion of the array of longitudinal filaments such that the liquid conduit comprises at least one grid portion and at least one non-grid portion. As an example, the array of longitudinal filaments may have a substantially cylindrical shape, in particular hollow-cylindrical shape. As another example, the array of longitudinal filaments may have a substantially conical shape or a substantially frustoconical shape, in particular a substantially hollow-conical shape or a substantially hollow-frustoconical shape. In any of these configurations, the longitudinal filaments form the shell surface of the cylindrical, conical, frustoconical, hollow-cylindrical, hollow-conical or hollow-frustoconical shape, respectively. The length axis of the respective shape extends substantially along the length extension of the longitudinal filaments. Advantageously, any of the aforementioned shapes provides an inherent mechanical dimensional stability. The array of transverse filaments preferably has a substantially ring shape in any of these configurations. That is, the transverse filaments extend along the circumference of the cylindrically, conically, frustoconically, hollow-cylindrical, hollow-conically or hollow-frustoconically shaped array of longitudinal filaments in the grid portion of the susceptor assembly. Seen as a whole, the susceptor assembly has a substantially crown shape in any of the afore-mentioned configurations. Furthermore, in case of conical, frustoconical, hollow-conical or hollow-frustoconical shape, the longitudinal filaments diverge from each other towards the base of the respective shape. Therefore, a conically, frustoconically, hollow-conically or hollow-frustoconically shaped array of longitudinal filaments facilitates providing a fan-out portion.

Preferably, the liquid conduit may be inductively heatable. For example, the liquid conduit may comprise or may be one of an inductively heatable filament bundle. As such, the liquid conduit advantageously is capable to perform both functions: conveying and heating an aerosol-forming liquid. Advantageously, this double function allows for a very material saving and compact design of the liquid conduit without separate means for conveying and heating. In addition, there is a direct thermal contact between the heat source, that is, the liquid conduit and the aerosol-forming liquid adhering thereto. Unlike in case of a heater in contact with a saturated wick, a direct contact between the liquid conduit and a small amount of liquid advantageously allows for flash heating, that is, for a fast onset of evaporation. To this extent, the liquid conduit may be considered to be or to comprise a liquid-conveying susceptor assembly. As used herein, the term "inductively heatable" refers to a liquid conduit comprising a susceptor material that is capable to convert electromagnetic energy into heat when subjected to an alternating magnetic field. This may be the result of at least one of hysteresis losses or eddy currents induced in the susceptor material, depending on its electrical and magnetic properties. Hysteresis losses occur in ferromagnetic or ferrimagnetic susceptor materials due to magnetic domains within the material being switched under the influence of an alternating electromagnetic field. Eddy currents are induced in electrically conductive susceptor materials. In case of an electrically conductive ferromagnetic or ferrimagnetic susceptor material, heat is generated due to both, eddy currents and hysteresis losses.

Accordingly, the inductively heatable liquid conduit may comprise at least a first susceptor material. The first susceptor material may comprise or may be made of a material that is at least one of electrically conductive and ferromagnetic or ferrimagnetic, respectively. That is, the first susceptor material may comprise or may be made of one of a ferrimagnetic material, or a ferromagnetic material, or an electrically conductive material, or electrically conductive ferrimagnetic material or electrically conductive ferromagnetic material.

In addition, the liquid conduit may comprise a second susceptor material. While the first susceptor material may be optimized with regard to heat loss and thus heating efficiency, the second susceptor material may be used as temperature marker. For this, the second susceptor material preferably comprises one of a ferrimagnetic material or a ferromagnetic material. In particular, the second susceptor material may be chosen such as to have a Curie temperature corresponding to a predefined heating temperature. At its Curie temperature, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined heating temperature has been reached. Preferably, the first susceptor material is different from the second susceptor material. The second susceptor material preferably has a Curie temperature that is lower than 500 degree Celsius. In particular, the second susceptor material may have a Curie temperature below 350 degree Celsius, preferably below 300 degree Celsius, more preferably below 250 degree Celsius, even more preferably below 200 degree Celsius, most preferably below 150 degree Celsius. Preferably, the Curie temperature is chosen such as to be below the boiling point of the aerosol-forming liquid to be vaporized in order to prevent the generation of hazardous components in the aerosol.

In particular, the liquid conduit may be an inductively heatable liquid conduit exclusively made of one or more susceptor materials.

As an example, the liquid conduit may comprise a plurality of first filaments comprising or being made of the first susceptor material. In addition, the liquid conduit may comprise a plurality of second filaments comprising or being made of the second susceptor material. To sufficiently work as temperature marker, only a few second filaments are required. Accordingly, the number of first filaments may be larger, in particular two times or three times or four times or five times or six times or seven times or eight times or nine times or ten times larger than the number of second filaments. Preferably, the diameter of the first and second filaments should be larger than twice the skin depth in order to induce a sufficient amount of eddy currents and thus to generate a sufficient amount of heat energy when being exposed to an alternating magnetic field. The skin depth is a measure of how far electrical conduction takes place in an electrically conductive susceptor material when being inductively heated. Accordingly, depending on the materials and the frequency of the alternating magnetic field used, the first and second filaments may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter. The second filaments may be randomly distributed throughout the liquid conduit. Advantageously, a random distribution requires only little effort during manufacturing of the liquid conduit.

The plurality of first filaments and the optional plurality of second filaments described before may be used in any of the configurations of the liquid conduit described above, for example, in a filament bundle comprising at least one parallel-bundle portion, in a filament bundle comprising two soaking sections and an intermediate portion or in liquid conduit comprising two filament arrays crossing each other partially such as to form at least one grid portion and at least one non-grid portion.

In case the liquid conduit is inductively heatable, it may be arranged off-center with regard to a geometrical center axis of the aerosol-generating article. Due to this, the liquid conduit may be arrangeable off-center with regard to a symmetry axis of an alternating magnetic field generated by an inductively heating aerosol-generating device into which the aerosol-generating article may be inserted for heating the liquid conduit. Advantageously, due to the off-center arrangement, that is, an asymmetric arrangement, the liquid conduit is arranged in a region of the alternating magnetic field having a higher field density as compared to a symmetric center arrangement. As a consequence, the heating efficiency is enhanced.

The aerosol-generating article may be an aerosol-generating article for single use or an aerosol-generating article for multiple uses. In the latter case, the aerosol-generating article may be refillable. That is, the main reservoir may be refillable with an aerosol-forming liquid. In any configuration, the aerosol-generating article may further comprise an aerosol-forming liquid contained in at least one of the main reservoir and the capillary buffer reservoir.

As used herein, the term "aerosol-forming liquid" relates to a liquid capable of releasing volatile compounds that can form an aerosol upon heating the aerosol-forming liquid. The aerosol-forming liquid is intended to be heated. The aerosol-forming liquid may contain both, solid and liquid aerosol-forming material or components. The aerosol-forming liquid may comprise a tobacco-containing material containing volatile tobacco flavor compounds, which are released from the liquid upon heating. Alternatively or additionally, the aerosol-forming liquid may comprise a non-tobacco material. The aerosol-forming liquid may further comprise an aerosol former. Examples of suitable aerosol formers are glycerin and propylene glycol. The aerosol-forming liquid may also comprise other additives and ingredients, such as nicotine or flavourants. In particular, the aerosol-forming liquid may include water, solvents, ethanol, plant extracts and natural or artificial flavors. The aerosol-forming liquid may be a water-based aerosol-forming liquid or an oil-based aerosol-forming liquid.

In addition, the article may comprise a mouthpiece. As used herein, the term "mouthpiece" means a portion of the article that is placed into a user's mouth in order to directly inhale an aerosol from the article. Preferably, the mouthpiece comprises a filter. The filter may be used to filter out undesired components of the aerosol. The filter may also comprise an add-on material, for example, a flavor material to be added to the aerosol.

According to the invention, there is also provided an aerosol-generating system comprising an aerosol-generating device and an aerosol-generating article according to the present invention and as described herein. The article is configured for use with the aerosol-generating device.

As used herein, the term "aerosol-generating device" is used to describe an electrically operated device that is capable of interacting with at least one aerosol-generating article including at least one aerosol-forming liquid such as to generate an aerosol by heating the aerosol-forming liquid within the article. Preferably, the aerosol-generating device is a puffing device for generating an aerosol that is directly inhalable by a user through the user's mouth. In particular, the aerosol-generating device is a hand-held aerosol-generating device.

The device may comprise a receiving cavity for removably receiving at least a portion of the aerosol-generating article.

In addition, the aerosol-generating device may comprise an electrical heating arrangement. The heating arrangement may be configured for heating the aerosol-forming liquid conveyed by the liquid conduit from the buffer reservoir (and—if applicable—from the main reservoir) to a region outside the buffer reservoir and the main reservoir, in particular to a vaporization zone as described above.

The heating arrangement may be a resistive heating arrangement comprising a resistive heating element for heating the aerosol-forming liquid. The resistive heating element may be, for example, a heating wire or a heating coil. In use, the resistive heating element is arranged in thermal contact or thermal proximity to the liquid conduit, in particular to a part of the liquid conduit which is arranged in a vaporization zone of the aerosol-generating article, when the aerosol-generating article is received in the aerosol-generating device.

Alternatively, the heating arrangement may be an inductive heating arrangement. That is, the aerosol-generating device may be an inductively heating aerosol-generating device. This configuration is particularly preferred in case the liquid conduit of the article is inductively heatable. Inductive heating may also work in case the aerosol-generating article comprises a (separate) susceptor element which is arranged in thermal contact or thermal proximity to the liquid conduit, in particular to a part of the liquid conduit which is arranged in a vaporization zone of the aerosol-generating article. It is also possible that the aerosol-generating device itself comprises a susceptor element which is arranged in thermal contact or thermal proximity to the liquid conduit, in particular to a part of the liquid conduit which is arranged in a vaporization zone of the aerosol-generating article, when the aerosol-generating article is received in the aerosol-generating device. In the latter configuration, that is, in case the liquid conduit itself is not inductively heatable, the susceptor element may be, for example, a susceptor sleeve or a susceptor coil surrounding the liquid conduit, in particular a part of the liquid conduit which is arranged in a vaporization zone of the aerosol-generating article.

The inductively heating aerosol-generating device, in particular the inductive heating arrangement may comprise at least one induction source configured and arranged to generate an alternating magnetic field in the receiving cavity in order to inductively heat the aerosol-forming liquid in the aerosol-generating article, when the article is received in the aerosol-generating device.

For generating the alternating magnetic field, the induction source may comprise at least one inductor, preferably at least one induction coil arranged around the receiving cavity. In case the liquid conduit is inductively heatable, the induction coil is arranged around the liquid conduit when the article is received in the receiving cavity, in particular around a part of the liquid conduit which is arranged in a vaporization zone of the aerosol-generating article.

The at least one induction coil may be a helical coil or flat planar coil, in particular a pancake coil or a curved planar coil. Use of a flat spiral coil allows a compact design that is robust and inexpensive to manufacture. Use of a helical induction coil advantageously allows for generating a homogeneous alternating magnetic field. As used herein a "flat spiral coil" means a coil that is generally planar, wherein the axis of winding of the coil is normal to the surface in which the coil lies. The flat spiral induction coil can have any desired shape within the plane of the coil. For example, the flat spiral coil may have a circular shape or may have a generally oblong or rectangular shape. However, the term "flat spiral coil" as used herein covers both, coils that are planar as well as flat spiral coils that are shaped to conform to a curved surface. For example, the induction coil may be a "curved" planar coil arranged at the circumference of a preferably cylindrical coil support, for example ferrite core. Furthermore, the flat spiral coil may comprise for example two layers of a four-turn flat spiral coil or a single layer of four-turn flat spiral coil. The at least one induction coil may be held within one of a main body or a housing of the aerosol-generating device.

The aerosol-generating article may be configured such that the inductively heatable liquid conduit—if present—is arranged off-center with regard to a symmetry axis of the alternating magnetic field generated by the induction source when the article is received in the receiving cavity of the aerosol-generating device. As described above, due to the off-center arrangement, that is, an asymmetric arrangement, the liquid conduit is arranged in a region of the alternating magnetic field having a higher field density as compared to a symmetric center arrangement. As a consequence, the heating efficiency is enhanced.

The induction source may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the at least one induction coil for generating an alternating magnetic field. The AC current may be supplied to the at least one induction coil continuously following activation of the system or may be supplied intermittently, such as on a puff by puff basis.

Preferably, the induction source comprises a DC/AC converter connected to the DC power supply including an LC network, wherein the LC network comprises a series connection of a capacitor and the inductor.

The induction source preferably is configured to generate a high-frequency magnetic field. As referred to herein, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The aerosol-generating device may further comprise a controller configured to control operation of the heating process, preferably in a closed-loop configuration, in particular for controlling heating of the aerosol-forming liquid to a pre-determined operating temperature. The operating temperature used for heating the aerosol-forming liquid may be in a range between 100 degree Celsius and 300 degree Celsius, in particular between 150 degree Celsius and 250 degree Celsius, for example 230 degree Celsius. These temperatures are typical operating temperatures for heating but not combusting the aerosol-forming substrate.

The controller may be or may be art of an overall controller of the aerosol-generating device. The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C power amplifier or a Class-D power amplifier or Class-E power amplifier. In particular, the induction source may be part of the controller.

The aerosol-generating device may comprise a power supply, in particular a DC power supply configured to provide a DC supply voltage and a DC supply current to the induction source. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source.

In case of an inductively heating aerosol-generating device, the aerosol-generating device may further comprise a flux concentrator arranged around at least a portion of the induction coil and configured to distort the alternating magnetic field of the at least one inductive source towards receiving cavity. Thus, when the article is received in the receiving cavity, the alternating magnetic field is distorted towards the inductively heatable liquid conduit, if present. Preferably, the flux concentrator comprises a flux concentrator foil, in particular a multi-layer flux concentrator foil.

Further features and advantages of the aerosol-generating system according to the present invention have already been described with regard to the aerosol-generating article according to the present invention and thus equally apply.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating article for use with an aerosol-generating device, the article comprising:

- a main reservoir for storing aerosol-forming liquid;
- a capillary buffer reservoir in fluid communication with the main reservoir for storing aerosol-forming liquid due to capillary action; and
- a liquid conduit in fluid communication at least with the capillary buffer reservoir for providing aerosol-forming liquid at an interface to the outside of the capillary buffer reservoir and the main reservoir.

Example Ex2: The aerosol-generating article according to example Ex1, wherein a maximum dimension between two opposing walls defining at least a portion of the capillary buffer reservoir is in a range between 0.2 millimeter and 5 millimeter, in particular between 0.5 millimeter and 3 millimeter, preferably between 1 millimeter and 2.5 millimeter.

Example Ex3: The aerosol-generating article according to any one of the preceding examples, wherein the capillary buffer reservoir comprises a total volume of at most 60 cubic millimeters, in particular at most 50 cubic millimeters, preferably at most 40 cubic millimeters, more preferably at most 30 cubic millimeters, most preferably at most 20 cubic millimeters.

Example Ex4: The aerosol-generating article according to any one of the preceding examples, wherein the capillary buffer reservoir comprises a total volume of at least 5 cubic millimeters, in particular at least 10 cubic millimeters, preferably at least 15 cubic millimeters.

Example Ex5: The aerosol-generating article according to any one of the preceding examples, wherein the capillary buffer reservoir comprises a lamella structure.

Example Ex6: The aerosol-generating article according to example Ex5, wherein the lamella structure comprises a plurality of lamellae, wherein a maximum dimension between adjacent lamellae is in a range between 0.2 millimeter and 5 millimeter, in particular between 0.5 millimeter and 2.5 millimeter, preferably between 1 millimeter and 2 millimeter.

Example Ex7: The aerosol-generating article according to any one of the preceding examples, wherein the main reservoir directly opens out into the capillary buffer reservoir.

Example Ex8: The aerosol-generating article according to any one of examples Ex1 to Ex6, wherein the main reservoir and the capillary buffer reservoir are in fluid communication with each other via at least a first liquid channel.

Example Ex9: The aerosol-generating article according to example Ex8, wherein the first liquid channel is configured such as to divert a liquid flow through the article by at least 90 degrees, in particular by 180 degrees.

Example Ex10: The aerosol-generating article according to any one of the preceding examples, wherein the main reservoir and the capillary buffer reservoir are in fluid communication with each other via a second liquid channel.

Example Ex11: The aerosol-generating article according to any one of examples Ex9 or Ex10, wherein a maximum dimension between two opposing walls defining at least a portion of at least one of the first fluid channel and the second fluid channel, in particular a diameter of at least one of the first fluid channel and the second fluid channel, is in a range between 0.2 millimeter and 5 millimeter, in particular between 0.5 millimeter and 4 millimeter, preferably between 1 millimeter and 3 millimeter, most preferably between 2 millimeter and 3 millimeter.

Example Ex12: The aerosol-generating article according to any one of the preceding examples, wherein with regard to a liquid flow through the article, the capillary buffer reservoir is downstream of the main reservoir.

Example Ex13: The aerosol-generating article according to any one of the preceding examples, wherein with regard to a liquid flow through the article, the liquid conduit is downstream of the capillary buffer reservoir.

Example Ex14: The aerosol-generating article according to any one of the preceding examples, wherein with regard to a liquid flow through the article, at least a portion of the fluid conduit is arranged at or in a downstream portion of the capillary buffer reservoir.

Example Ex15: The aerosol-generating article according to any one of the preceding examples, wherein the capillary buffer reservoir is arranged adjacent to the main reservoir.

Example Ex16: The aerosol-generating article according to any one of the preceding examples, further comprising a partition wall defining both, at least a portion of the main reservoir and at least a portion of the capillary buffer reservoir.

Example Ex17: The aerosol-generating article according to any one of the preceding examples, wherein at least a portion of the main reservoir and at least a portion of the capillary buffer reservoir are formed integrally with each other.

Example Ex18: The aerosol-generating article according to any one of the preceding examples, wherein the liquid conduit is in direct fluid communication with the main reservoir.

Example Ex19: The aerosol-generating article according to any one of the preceding examples, further comprising a bypass channel providing a direct fluid communication between main reservoir and the fluid conduit, bypassing the main reservoir.

Example Ex20: The aerosol-generating article according to any one of the preceding examples, further comprising three intersecting fluid channels each of which is connected to one of the main reservoir, the capillary buffer reservoir and the fluid conduit for providing a nodal fluid communication between each two of the main reservoir, the capillary buffer reservoir and the fluid conduit.

Example Ex21: The aerosol-generating article according to any one of the preceding examples, wherein the liquid conduit passes through a wall defining at least a portion of the capillary buffer reservoir.

Example Ex22: The aerosol-generating article according to any one of the preceding examples, wherein the article comprises a vaporization zone.

Example Ex23: The aerosol-generating article according to example Ex22, wherein the liquid conduit passes into the vaporization zone or faces the vaporization zone.

Example Ex24: The aerosol-generating article according to any one of the preceding examples, wherein the liquid conduit comprises a wick element, in particular a filament bundle, preferably an unstranded filament bundle, or a mesh.

Example Ex25: The aerosol-generating article according to any one of the preceding examples, wherein the liquid conduit is inductively heatable.

Example Ex26: The aerosol-generating article according to any one of the preceding examples, wherein the liquid conduit comprises a liquid-conveying susceptor assembly.

Example Ex27: The aerosol-generating article according to any one of the preceding examples, further comprising an aerosol-forming liquid contained in at least one of the main reservoir and the capillary buffer reservoir.

Example Ex28: An aerosol-generating system comprising an aerosol-generating device and an aerosol-generating article according to any one of the preceding examples for use with the device.

Examples will now be further described with reference to the figures in which:

FIG. 1 schematically illustrates a first embodiment of an aerosol-generating article according to the present invention;

Figure 1:
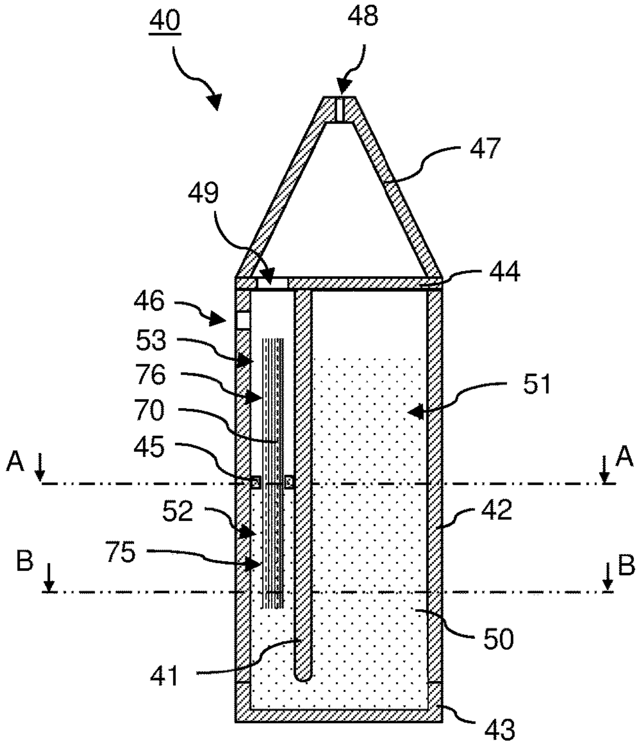
Figure 4:
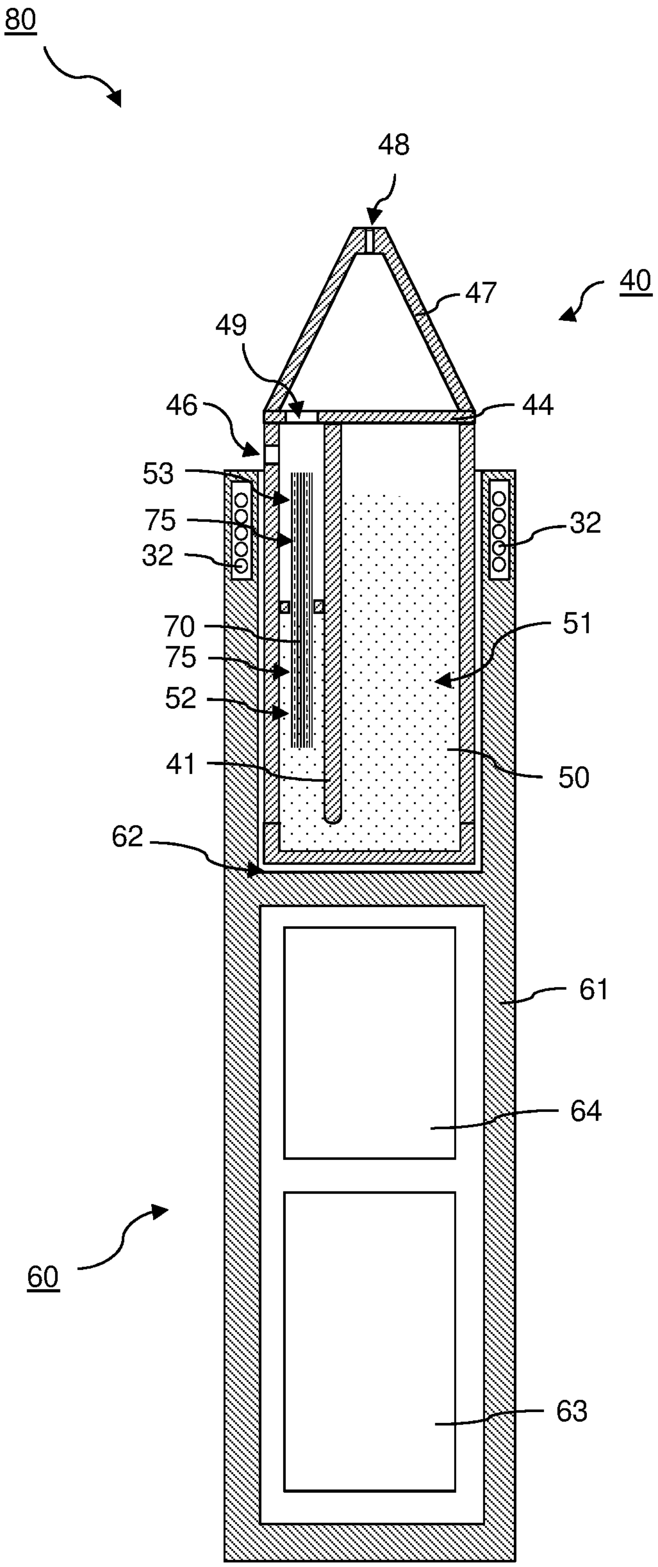
Figure 5:
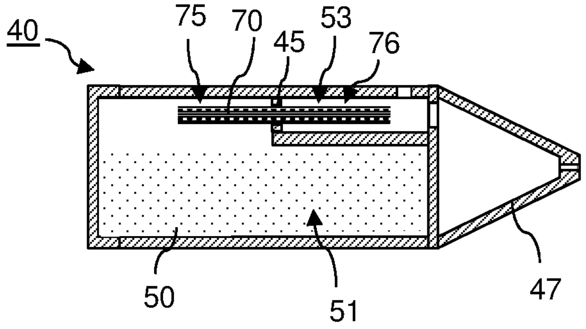
Figure 6:
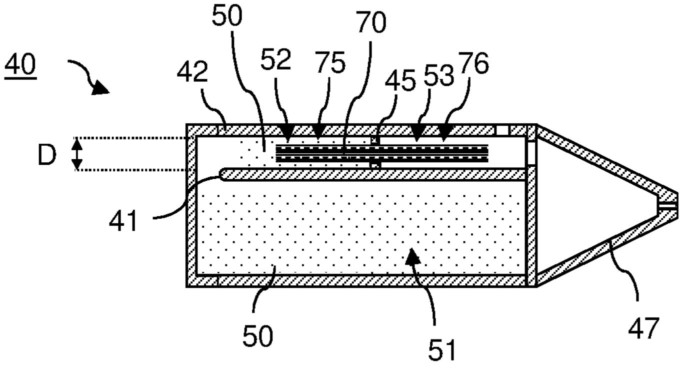
Figure 7:
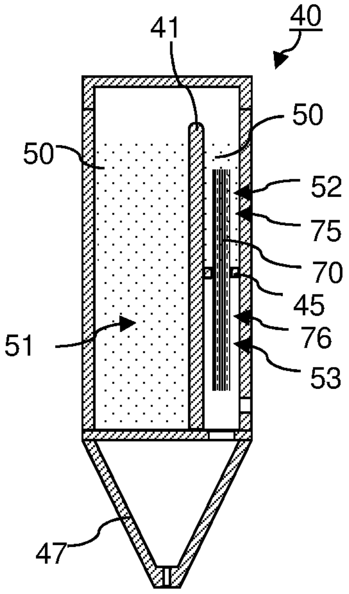
Figure 8:
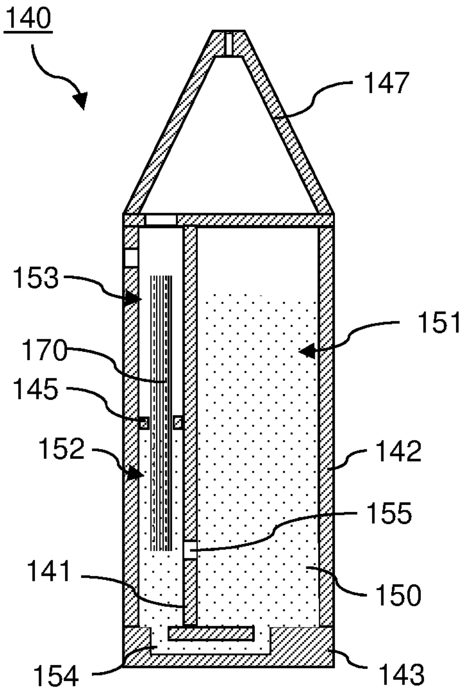
Figure 9:
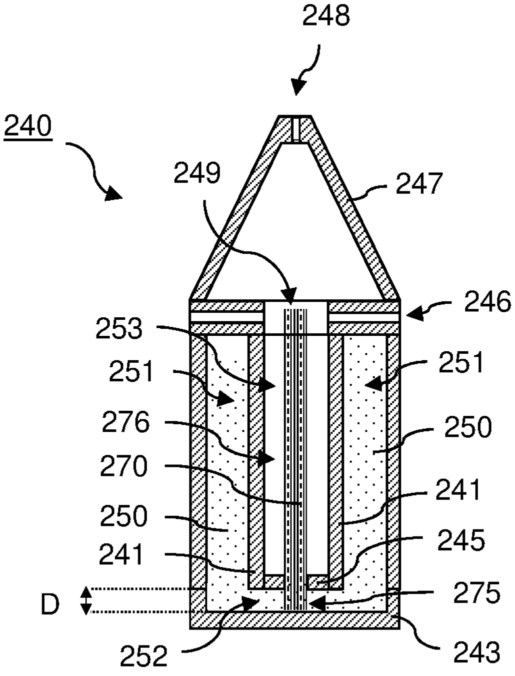
Figure 10:
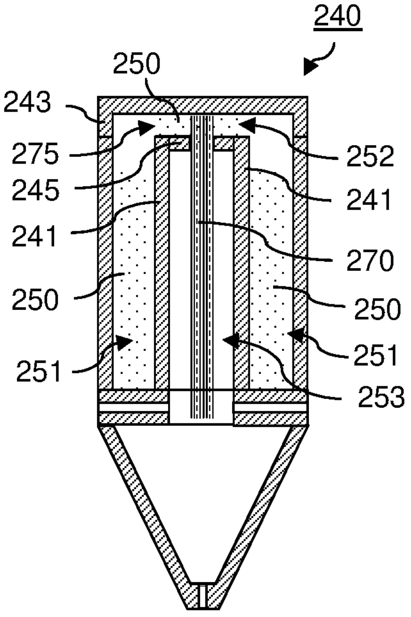
Figure 11:
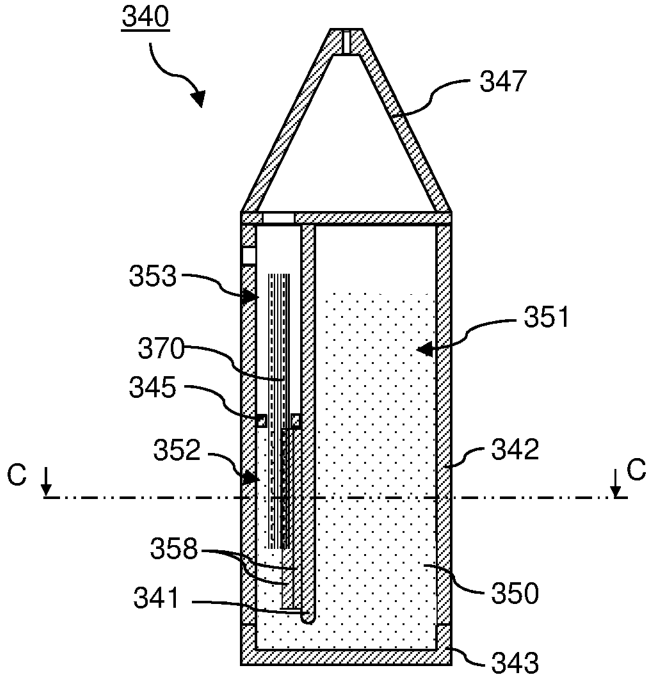
Figure 12:
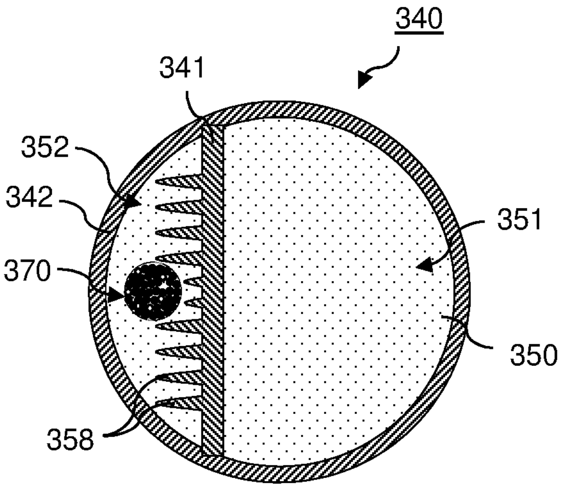

FIG. 4 schematically illustrates an exemplary embodiment of an aerosol-generating system according to the present invention, comprising the article according to FIG. 1 and an aerosol-generating device for use with the article;

FIG. 5 shows the aerosol-generating article similar to the article shown in FIG. 1, yet without a partition wall;

FIG. 6 shows the aerosol-generating article according to FIG. 1 in a substantially horizontal position;

FIG. 7 shows the aerosol-generating article according to FIG. 1 in an upside down position;

FIG. 8 schematically illustrates a second embodiment of an aerosol-generating article according to the present invention;

FIG. 9 schematically illustrates a third embodiment of an aerosol-generating article according to the present invention;

FIG. 10 shows the aerosol-generating article according to FIG. 9 in an upside down position;

FIG. 11 schematically illustrates a fourth embodiment of an aerosol-generating article according to the present invention; and FIG. 12 shows a cross-section through the aerosol-generating article according to FIG. 11 along line C-C.

FIG. 1 schematically illustrates an aerosol-generating article 40 according to a first embodiment of the present invention. As will be described in more detail further below with regard to FIG. 4, the aerosol-generating article 40 is configured for use with an inductively heating aerosol-generating device in order to vaporize an aerosol-forming liquid 50 provided by the aerosol-generating article 40. The article 40 comprises a substantially cylindrical article housing made of a liquid impermeable rigid material, for example PP (polypropylene). The article housing comprises a cylindrical reservoir body 42, a bottom end cap 43 at one end of the reservoir body 42 and a top end cap 44 at the opposite end of the of the reservoir body 42. The article further comprises a partition wall 41 partitioning the inner void of the reservoir body 42 into a first compartment and a second compartment. The first compartment and the second compartment are laterally arranged adjacent to each other along a longitudinal axis of the reservoir body 42. The first compartment serves as a main reservoir 51 for storing aerosol-forming liquid 50. Within the second compartment, the article 40 comprises a substantially disc-shaped bushing 45 at about half way of the length extension of the reservoir body 42. The bushing 45 separates the inner void of the second compartment into two portions, namely, a vaporization cavity 53 and a capillary buffer reservoir 52 for storing aerosol-forming liquid due to capillary action. This will be described in more detail further below. Via a recess in the bottom end cap 43, the capillary buffer reservoir 52 is in fluid communication with the main reservoir 51. The recess in the bottom end cap 43 is formed such that the main reservoir 51 directly opens out into the capillary buffer reservoir 52 allowing aerosol-forming liquid 50 to freely flow from the main reservoir 51 into the capillary buffer reservoir 52. To facilitate the liquid flow around the free end of the partition wall 41 facing the bottom end cap 43, the free end of the partition wall 41 comprises rounded edges. In particular, rounded edges facilitate air seeping into the reservoirs to flow around the end of the partition. In contrast, sharp edges could be bubble trappers due to pinning of the contact line.

In general, the aerosol-generating article 40 may be an aerosol-generating article for single use or an aerosol-generating article for multiple uses. In the latter case, the aerosol-generating article 40 may be refillable. That is, the main reservoir 51 may be refillable with aerosol-forming liquid 50 after depletion.

Figure 2:
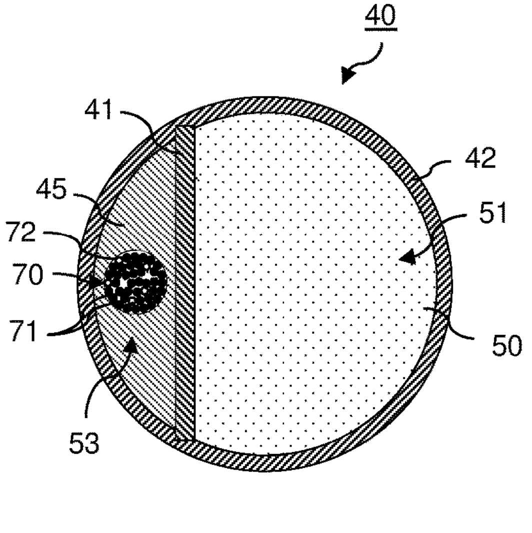
FIG. 2 shows a cross-section through the aerosol-generating article according to FIG. 1 along line A-A.
Figure 3:
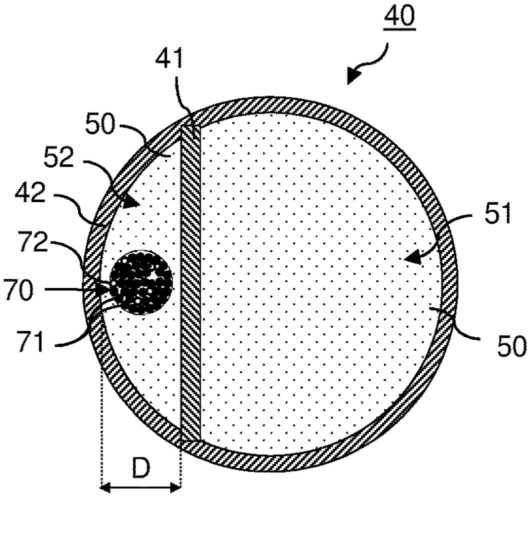
FIG. 3 shows a cross-section through the aerosol-generating article according to FIG. 1 along line B-B.

The article 40 further comprises a liquid conduit 70 in fluid communication with the capillary buffer reservoir 52 for conveying aerosol-forming liquid 50 from the capillary buffer reservoir 52 into the vaporization cavity 53. Further details of the liquid conduit 70 are illustrated in FIG. 2 and FIG. 3, which show a respective cross-section through the aerosol-generating article according to FIG. 1 along line A-A and line B-B, respectively. In the present embodiment, the liquid conduit 70 is realized as an unstranded filament bundle comprising a plurality of filaments 71, 72 arranged parallel to each other. Due to the arrangement of the filaments 71, 72 in the filament bundle and due to the small diameter of the filaments 71, 72, the liquid conduit 70 comprises narrow channels formed between the filaments 71, 72. These channels provide capillary action along the length extension of the liquid conduit 70, thus allowing for conveying aerosol-forming liquid 50 from the capillary buffer reservoir 52 into the vaporization cavity 53.

In addition to the liquid conveying property, the liquid conduit 70 is also configured for inductive heating. For that purpose, the liquid conduit 70 comprises at least a plurality of first filaments 71 including a first susceptor material that is optimized with regard to heat generation. The liquid conduit 70 may also comprises a plurality of second filaments 72 including a second susceptor material which serves as temperature marker, as described further above. Due to the susceptive nature of the filament materials, the liquid conduit 70 is capable to be inductively heated in an alternating magnetic field and thus to vaporize aerosol-forming liquid in thermal contact with the filaments 71, 72. The liquid conduit 70 thus is capable to perform two functions: conveying and heating aerosol-forming liquid. For this reason, the liquid conduit may also be denoted as a liquid-conveying susceptor assembly.

As can be seen in FIG. 1, the liquid conduit 70 passes through an opening in the bushing 45 such that a first portion of the liquid conduit 70 is arranged in the buffer reservoir 52 and a second portion is arranged in the vaporization cavity 53. The opening through the bushing 45 serves not only as a feedthrough for the liquid conduit, but also for bundling the filaments 71, 72, that is, for keeping the filaments 71, 72 together. Furthermore, the opening serves to fix the position of the liquid conduit 70 relative to the article housing. As can be further seen in FIG. 2 and FIG. 3, the filament bundle of the liquid conduit 70 has a substantially circular cross-section which is particularly easy to manufacture.

As the first portion of the liquid conduit 70 is arranged in the buffer reservoir 52 and thus immersed in aerosol-forming liquid 50, it acts as a soaking section 75 for conveying aerosol-forming liquid 50 from the buffer reservoir 52 to the second portion of the liquid conduit 70. In the vaporization cavity 53, the second portion acts at least partially as a heating section 76 for vaporizing aerosol-forming liquid 50 when being exposed to an alternating magnetic field in order to inductively heat the filaments 71, 72. This will be described in more detail below with regard to FIG. 4.

As can be further seen in FIG. 1, the article 40 comprises at least one air inlet 46 through the reservoir body 42 into the vaporization cavity 53 which enables air to enter the vaporization cavity 53. The air inlet 46 may be configured to provide airflow at or around the heating section 76 of the liquid conduit 70. The air inlet 46 may be a hole through the reservoir body 42. Likewise, the air inlet 46 may be a nozzle that is configured to direct airflow to a specific target location at the liquid conduit 70. In addition, the article 40 comprises a tapered shape mouthpiece 47 which is attached to the top end cap 44 and configured to be taken into a user's mouth for puffing. The mouthpiece 47 further includes a filter (not shown) and an air outlet 48. The mouthpiece 47 is in fluid communication with the vaporization cavity 45 through an outlet 49 in the top end cap 44. Hence, when a user takes a puff at the mouthpiece 47, air is drawn into the vaporization cavity 53 through the air inlet 46. From there, the air passes through the aperture 49 into the mouthpiece 47 and further through the filter 55 and the air outlet 48 into a users' mouth. In the vaporization cavity 53, aerosol-forming liquid vaporized from the heating section 76 of the liquid conduit 70 is exposed to the air passing through the article 40 such as to form an aerosol which may then be drawn out through the mouthpiece 47.

FIG. 4 schematically illustrates an aerosol-generating system 80 according to an exemplary embodiment of the present invention. The system 80 comprises an aerosol-generating article 40 as shown in FIG. 1-3 as well as an electrically operated aerosol-generating device 60 that is capable of interacting with the article 40 in order to generate an aerosol. For this, the aerosol-generating device 60 comprises a receiving cavity 62 formed within the device housing 61 at a proximal end of the device 60. The receiving cavity 62 is configured to removably receive at least a portion of the aerosol-generating article 40. In particular, the aerosol-generating device is configured to inductively heat the heating section 76 of the liquid conduit 70 in order to vaporize aerosol-forming liquid 50 that is conveyed from the capillary buffer reservoir 52 via the soaking section 75 to the heating section 76 in the vaporization cavity 53. For this, the aerosol-generating device 60 comprises an induction source including an induction coil 32. In the present embodiment, the induction coil 32 is a single helical coil which is arranged and configured to generate a substantially homogeneous alternating magnetic field within the receiving cavity 62. As can be seen in FIG. 4, the induction coil 32 is arranged around the proximal end portion of the receiving cavity 62 such as to only surround the heating section 76 of the liquid conduit 70 when the aerosol-generating article 40 is received in the receiving cavity 62. Accordingly, in use of the device 60, the induction coil 32 generates an alternating magnetic field that only penetrates the heating section 76 of the liquid conduit 70 in the vaporization cavity 53 of the article 40. In contrast, due to the local heating, the soaking section 75 of the liquid conduit 70 stays at temperatures below the vaporization temperature. Thus, boiling of aerosol-forming liquid 50 within the capillary buffer reservoir 52 and the main reservoir 51 is prevented. Hence, in use the liquid conduit 70 comprises a temperature profile along its length extension with sections of higher and lower temperatures. More specifically, the temperature profile shows a temperature increase from temperatures below a vaporization temperature T_vap of the aerosol-forming liquid 50 in the soaking section 75 to temperatures above the respective vaporization temperature in the heating section 76.

The actual temperature profile forming up in use of the susceptor assembly 10 depends on the thermal conductivity and the length of the liquid conduit 70. Accordingly, in order to have sufficient temperature gradient between the soaking sections 75 and the heating section 76, the liquid conduit 70 requires a certain total length. With regard to the present embodiment, the total length of the liquid conduit 70 may be in a range between 5 millimeter and 50 millimeter, in particular between 10 millimeter and 40 millimeter, preferably between 10 millimeter and 30 millimeter, more preferably between 10 millimeter and 20 millimeter.

The liquid conduit 70 is arranged off-center with regard to the geometrical center axis of the aerosol-generating article 40. Due to this, the liquid conduit 70 is arranged off-center with regard to the symmetry axis of the alternating magnetic field generated by the induction coil 32 when the article 40 is received in the cavity 62 of the device 60. Advantageously, due to the off-center arrangement, the liquid conduit 70 is arranged in a region of the alternating magnetic field having a higher field density as compared to a symmetric center arrangement. As a consequence, the heating efficiency is enhanced.

The aerosol-generating device 60 further comprises a controller 64 for controlling operation of the aerosol-generating system 80, in particular for controlling the heating operation. Furthermore, the aerosol-generating device 60 comprises a power supply 63 providing electrical power for generating the alternating magnetic field. Preferably, the power supply 63 is a battery such as a lithium iron phosphate battery. The power supply 63 may have a capacity that allows for the storage of enough energy for one or more user experiences. Both, the controller 64 and the power supply 63 arranged in a distal portion of the aerosol-generating device 60.

The function of the capillary buffer reservoir 52 will now be described in more detail with regard to FIG. 5-7.

FIG. 5 shows the aerosol-generating article 40 according to FIG. 1, yet without comprising a capillary buffer reservoir. Further in contrast to FIG. 1, FIG. 5 shows the article 40 in a substantially horizontal orientation. Due to the different orientation, the aerosol-forming liquid 50 in the article 40 is re-distributed in such a way that—depending on the fluid level—the liquid conduit 70 is not in contact with the aerosol-forming liquid 50 anymore. As a consequence, the delivery of aerosol-forming liquid to the vaporization zone 53 is interrupted which causes a rapid decrease or even outage of aerosol formation if the article was used in this orientation for a certain time.

The purpose of the buffer reservoir 52 is to remedy this. Basically, the buffer reservoir 52 provides a small volume reservoir that is in fluid communication with the main reservoir 51 and the liquid conduit 70 and configured to trap a certain amount of aerosol-forming liquid due to capillary action independent of the article orientation. For this, at least one dimension of the capillary buffer reservoir 52 is chosen to be on the order of the effective capillary length, which typically is in the range of a few millimeters for most liquids. In the present embodiment, the capillary action of the buffer reservoir 52 is caused by the fact that the maximum distance D between opposing portions of the partition wall 41 and the inner surface of the reservoir body 42 is in a range of a few millimeters only, as indicated in FIG. 3 and FIG. 6. For example, the maximum distance D may be in a range between 1 millimeter and 5 millimeter. Due to this, capillary effects dominate over gravity in the capillary buffer reservoir 52. As a consequence, once aerosol-forming liquid 50 filled in the buffer reservoir 52, it is prevented from flowing back into the main reservoir 51 when the orientation of the article is changed, for example, when the article 40 is turned from a substantially upright position as shown in FIG. 1 into a substantially horizontal position as shown FIG. 6, or even into an upside down position as shown in FIG. 7. Hence, independent of the article orientation, the buffer reservoir 40 reliably traps the liquid aerosol-forming due to the capillary action of its small volume, similar to a buffer reservoir of a fountain pen. Yet, the capillary action along the liquid conduit is still large enough to convey the trapped liquid from the capillary buffer reservoir 52 to the vaporization zone.

The volume of the buffer reservoir is chosen such as to provide sufficient liquid available for a few puffs, independent of the article orientation. Accordingly, the total volume of the capillary buffer reservoir 52 may be at least 5 cubic millimeters, in particular at least 10 cubic millimeters, preferably at least 15 cubic millimeters.

FIG. 8 schematically illustrates a second exemplary embodiment of an aerosol-generating 140 article according to the present invention. In general, the aerosol-generating article 140 according to FIG. 8 is very similar to the aerosol-generating article 40 shown in FIG. 1. Therefore, identical or similar features are denoted with the same reference signs, yet incremented by 100. In contrast to the first embodiment shown in FIG. 1, the main reservoir 151 does not directly open out into the capillary buffer reservoir 152. Instead, the main reservoir 151 and the capillary buffer reservoir 152 are in fluid communication with each other via a liquid channel 154. The first liquid channel is formed within the bottom end cap 143 and configured such as to divert the liquid flow from the main reservoir 151 to the capillary buffer reservoir 152 by 180 degrees. This configuration may retard an unexpected reflow of aerosol-forming liquid from the capillary buffer reservoir 152 into the main reservoir 154. In addition to the first liquid channel 154, the main reservoir 151 and the capillary buffer reservoir 152 are also in fluid communication with each other via a second liquid channel 155 through the partition wall 141. The second channel 155 may facilitate, in particular expedite a refill of the capillary buffer reservoir 152 from the main reservoir 151 while or after the aerosol-forming liquid in the capillary buffer reservoir is depleted via the liquid conduit 170 is use of the system.

FIG. 9 and FIG. 10 schematically illustrate a third exemplary embodiment of an aerosol-generating 240 article according to the present invention. In general, the aerosol-generating article 240 according to FIGS. 9 and 10 is similar to the aerosol-generating article 40 shown in FIG. 1. Therefore, identical or similar features are denoted with the same reference signs, yet incremented by 200. In contrast to the article 40 shown in FIG. 1, the article 240 according to FIGS. 9 and 10 comprises a liquid conduit 270, a buffer reservoir 252 and a vaporization zone 253 which are arranged symmetrically with regard to the geometrical center axis of the 40. The vaporization cavity 253 is formed by a cylindrical partition wall 241 which is arranged coaxially in the cylindrical reservoir body 242. A substantially hollow cylindrical main reservoir 251 is formed between the cylindrical reservoir body 242 and the cylindrical partition wall 241. At a bottom portion, the vaporization cavity 253 is closed by a disc-shaped bushing 245. Likewise, the cylindrical reservoir body 242 is closed by a bottom end cap 243 which comprises a recess similar to the bottom end cap 43 of the article 40 shown in FIG. 1. There, a capillary buffer reservoir 252 is formed between the inner surface of the bottom end cap 243 on the one side, and the end face of the cylindrical partition wall 241 and the disc-shaped bushing 245 on the other side. The distance D between the inner surface of the bottom end cap 243 and the end face of the cylindrical partition wall 241 and the disc-shaped bushing 245 is chosen to be on the order of the effective capillary length, for example, in a range between 1 millimeter and 5 millimeter. Due to this, once filled with aerosol-forming liquid, the buffer reservoir 252 traps a certain amount of aerosol-forming liquid due to capillary action, even when the orientation of the article 240 is changed, for example, when the article 40 is turned form a substantially upright position as shown in FIG. 9 into an upside down position as shown in FIG. 10. Hence, the soaking section 275 of the liquid conduit 270 is always in contact with aerosol-forming liquid independent of the article position. The volume of the capillary buffer reservoir 252 is chosen such that the trappable amount of aerosol-forming liquid suffices at least for a few puffs.

FIG. 11 and FIG. 12 schematically illustrate a fourth exemplary embodiment of an aerosol-generating 240 article according to the present invention. In general, the aerosol-generating article 340 according to FIGS. 11 and 12 is similar to the aerosol-generating article 40 shown in FIG. 1. Therefore, identical or similar features are denoted with the same reference signs, yet incremented by 300. In contrast to the article 40 shown in FIG. 1, the article 340 according to FIGS. 11 and 12 additionally comprises a plurality of lamellae 358 at the partition wall 341. The plurality of lamellae 358 advantageously increases the inner surface of the buffer reservoir 352, and thus its capillary action. Basically, the lamella structure acts like a lamella structure in a fountain pen. In the present, the distance between adjacent lamellae may be in a range between 1 millimeter and 2 millimeter.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating article for an aerosol-generating device, the aerosol-generating article comprising:

a main reservoir configured to store aerosol-forming liquid;

a capillary buffer reservoir in fluid communication with the main reservoir configured to store the aerosol-forming liquid due to capillary action; and a liquid conduit in fluid communication at least with the capillary buffer reservoir and being configured to provide the aerosol-forming liquid at an interface to an outside of the capillary buffer reservoir and the main reservoir, wherein the liquid conduit comprises a filament bundle, wherein the filament bundle comprises a plurality of first filaments comprising or being made of a first susceptor material, and wherein the capillary buffer reservoir is free of any capillary material or liquid retention material.

2. The aerosol-generating article according to claim 1, wherein a maximum dimension between two opposing walls defining at least a portion of the capillary buffer reservoir is in a range between 0.2 millimeter and 5 millimeters.

3. The aerosol-generating article according to claim 1, wherein a maximum dimension between two opposing walls defining at least a portion of the capillary buffer reservoir is in a range between 1 millimeter and 2.5 millimeters.

4. The aerosol-generating article according to claim 1, wherein the capillary buffer reservoir comprises a total volume of up to 60 cubic millimeters.

5. The aerosol-generating article according to claim 1, wherein the capillary buffer reservoir comprises a total volume of up to 20 cubic millimeters.

6. The aerosol-generating article according to claim 1, wherein the capillary buffer reservoir comprises a lamella structure.

7. The aerosol-generating article according to claim 1, wherein the main reservoir directly opens out into the capillary buffer reservoir, or wherein the main reservoir and the capillary buffer reservoir are in fluid communication with each other via at least a first liquid channel.

8. The aerosol-generating article according to claim 7, wherein the first liquid channel is configured such as to divert a liquid flow through the aerosol-generating article by at least 90 degrees.

9. The aerosol-generating article according to claim 7, wherein the first liquid channel is configured such as to divert a liquid flow through the aerosol-generating article by 180 degrees.

10. The aerosol-generating article according to claim 1, wherein with regard to a liquid flow through the aerosol-generating article, the capillary buffer reservoir is downstream of the main reservoir and the liquid conduit is downstream of the capillary buffer reservoir.

11. The aerosol-generating article according to claim 1, wherein with regard to a liquid flow through the aerosol-generating article, at least a portion of the liquid conduit is arranged at or in a downstream portion of the capillary buffer reservoir.

12. The aerosol-generating article according to claim 1, wherein the capillary buffer reservoir is arranged adjacent to the main reservoir.

13. The aerosol-generating article according to claim 1, further comprising a partition wall defining both of at least a portion of the main reservoir and at least a portion of the capillary buffer reservoir.

14. The aerosol-generating article according to claim 1, wherein at least a portion of the main reservoir and at least a portion of the capillary buffer reservoir are formed integrally with each other.

15. The aerosol-generating article according to claim 1, further comprising a vaporization zone, wherein the liquid conduit passes into the vaporization zone or faces the vaporization zone.

16. The aerosol-generating article according to claim 15, wherein the main reservoir, the capillary buffer reservoir, and the vaporization zone are fluidly connected in series.

17. An aerosol-generating system comprising an aerosol-generating device and an aerosol-generating article according to claim 1 for the aerosol-generating device.

18. An aerosol-generating article for an aerosol-generating device, the aerosol-generating article comprising:

a main reservoir configured to store aerosol-forming liquid;

a capillary buffer reservoir in fluid communication with the main reservoir configured to store the aerosol-forming liquid due to capillary action; and a liquid conduit in fluid communication at least with the capillary buffer reservoir and being configured to provide aerosol-forming liquid at an interface to an outside of the capillary buffer reservoir and the main reservoir, wherein the liquid conduit comprises a filament bundle, wherein the filament bundle comprises a plurality of first filaments comprising or being made of a first susceptor material, and wherein the capillary buffer reservoir comprises a lamella structure.

* * * * *